United States Patent [19]

Montefusco et al.

[11] 3,843,943

[45] Oct. 22, 1974

[54] COUPLING CIRCUIT FOR TELEPHONE LINE AND THE LIKE

[75] Inventors: Nicola Montefusco; Marcello Manca, both of Milan, Italy

[73] Assignee: Societa Italiana Telecomunicazioni Siemens S.p.A., Milano, Italy

[22] Filed: Feb. 28, 1973

[21] Appl. No.: 336,717

[30] Foreign Application Priority Data

Feb. 29, 1972 Italy .................................. 21157/72

[52] U.S. Cl. ......... 333/24 R, 179/175.2 C, 330/107, 333/80 R

[51] Int. Cl. .......................... H03h 7/00, H04m 3/22

[58] Field of Search .................. 333/80 R, 80 T, 24; 330/21, 31, 30 D, 69, 107, 109; 179/170 G, 175.2 C; 307/286, 322

[56] References Cited

UNITED STATES PATENTS

| | | | |
|---|---|---|---|
| 2,941,041 | 6/1960 | Ensink | 179/170 G UX |
| 3,061,790 | 10/1962 | Theriault | 307/322 X |
| 3,108,231 | 10/1963 | Carlson et al. | 307/286 X |
| 3,243,740 | 3/1966 | Sziklai | 333/80 R |
| 3,344,285 | 9/1967 | Frye | 307/286 X |
| 3,493,901 | 2/1970 | Deboo | 333/80 R |
| 3,736,517 | 5/1973 | Lim | 333/80 R X |

*Primary Examiner*—Paul L. Gensler
*Attorney, Agent, or Firm*—Karl F. Ross; Herbert Dubno

[57] ABSTRACT

The primary of a transformer serving to couple a monitoring instrument across a low-frequency communication channel, such as a telephone line, is shunted by a two-terminal network with an at least partly inductive negative impedance. The absolute magnitude of the negative-inductance component of this impedance is slightly higher than the inductance of the transformer primary whereby the overall effective inductance of the primary loop is high. The two-terminal network includes an operational amplifier with a capacitor and a resistor serially connected in its output circuit, their junction being tied to the inverting amplifier input whereas the noninverting input is connected to the amplifier output through another resistor. A further resistor, connected across the capacitor, adds to the network impedance a negative resistive component which should be larger than the parasitic resistance of the primary loop to stabilize the transformer circuit.

5 Claims, 3 Drawing Figures

COUPLING CIRCUIT FOR TELEPHONE LINE AND THE LIKE

FIELD OF THE INVENTION

Our present invention relates to a coupling circuit, including a transformer, for connecting a load (e.g., a measuring instrument) to a low-frequency communication channel.

BACKGROUND OF THE INVENTION

If the activity of a telephone line or the like is to be monitored by an instrument such as an a-c voltmeter inductively coupled to that line, the impedance of the coupling circuit must conform to certain requirements under CCITT regulations in order to prevent any objectionable change in the reflection coefficient and the group retardation of the line. If the latter is designed for a low audio frequencies in a range of, say, 20 – 200 Hz, the inductivity of the primary winding of the coupling transformer has to be very high (on the order of tens of henrys) to satisfy these requirements. Such large inductances, coupled with a small distributed inductance of the primary loop, are very difficult to realize in a system composed of passive circuit elements.

A solution heretofore adopted in dealing with this problem is the use of a smaller, more easily realizable inductance in the primary winding, in combination with an equalizer designed to compensate for variations in group velocity. Such circuits, however, are relatively bulky and expensive.

OBJECTS OF THE INVENTION

The general object of our present invention is to provide an improved coupling circuit, of the character and for the purpose described, which in a relatively simple manner maintaining galvanic isolation between the communication channel and the load while satisfying the aforestated CCITT requirements.

A more specific object is to provide a circuit of this description whose effective inductivity, as seen from the line connected to the transformer primary, has the requisite high value even though the primary itself has only a relatively low inductance.

SUMMARY OF THE INVENTION

These objects are realized, pursuant to our present invention, by connecting a two-terminal network in shunt with the transformer primary, this network having a negative impedance with an inductive component whose absolute magnitude is on the order of that of the inductance of the primary.

As will be shown in greater detail hereinafter, such a parallel connection of a positive and a negative inductance provides a resulting overall inductance whose value can be made as large as desired by selecting a negative inductance whose absolute magnitude is close to that of the positive inductance. If the absolute magnitude of this negative inductance exceeds that of the positive inductance, the overall inductance of the primary circuit is of positive sign.

Such an active network of at least partly inductive negative impedances can be constituted, according to a more particular feature of our invention, by an operational amplifier whose output terminal is connected through a first resistor to the noninverting input terminal and through a capacitor to the inverting input terminal thereof, the capacitor lying in series with a second resistor connected between the inverting input terminal and the reference terminal (usually ground) common to the input and the output side of the amplifier. By connecting a third resistor in shunt with the capacitor, the overall resistance of the primary loop can be made positive so as to prevent the creation of an oscillatory condition.

BRIEF DESCRIPTION OF THE DRAWING

The above and other features of our invention will now be described in detail with reference to the accompanying drawing in which.

SPECIFIC DESCRIPTION

Figure 1:
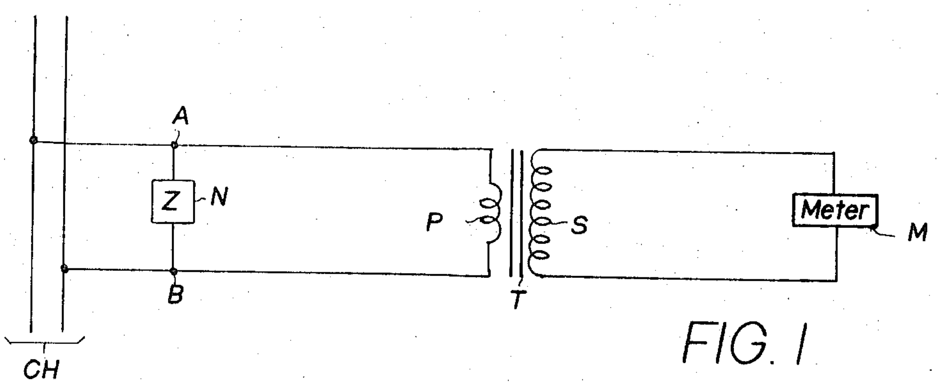
FIG. 1 is a diagram of a coupling circuit according to our invention.

In FIG. 1 we have shown a communication channel CH, such as a two-wire telephone line, with the primary P of a voltage-step-up transformer T connected thereacross. The secondary S of transformer T works into a load in the form of a meter M designed to monitor the acitvity of channel CH.

Figure 2:
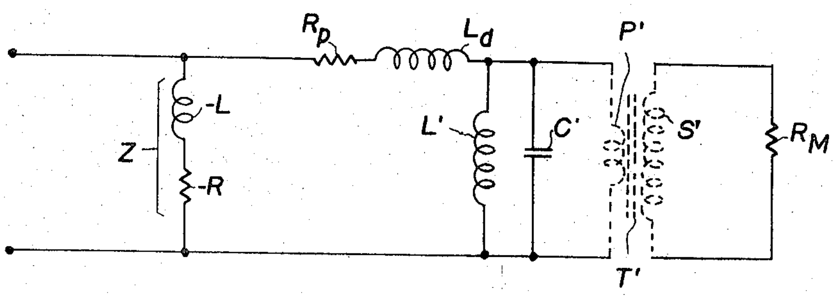
FIG. 2 shows an equivalent circuit of the physical arrangement illustrated in FIG. 1.

A network N of impedance Z is bridged across the primary P between two supply terminals A and B. Impedance Z has an inductive component of negative sign, shown at –L in the equivalent circuit of FIG. 2, and further includes a negative resistance –R. Also shown in FIG. 2 are the effective parasitic resistance $R_p$ of the primary P (including the conductors linking that winding with points A and B) and the distributed inductance $L_d$ of the primary loop. FIG. 2 further illustrates the inductance L′ and the leakage capacitance C′ of primary P as well as a virtual transformer T′ whose primary winding P′ is considered of infinite impedance and whose secondary winding S′ feeds the load M (FIG. 1) whose resistance $R_M$, upon closure of the secondary circuit, is assumed to be 600 Ω.

In practice, the distributed inductance $L_d$ should not be more than about 1 mH, e.g., 0.7 mH, whereas the leakage capacitance C′ may range between about 1.5 and 2 nF. The overall inductance of the coupling circuit as seen from line CH should be about 20 to 30 H in conformity with CCITT regulations.

If we disregard the parasitic resistance $R_p$ and the negative resistance –R, we can express the equivalent inductance $L_{eq}$ by $$L_{eq} = -LL'/L'-L = LL'/L-L' \qquad (1)$$

which shows that $L_{eq}$ can be made large by making the difference $L-L'$ correspondingly small.

Thus, for example, with $L \equiv |-L| = 305$ mH and $L' = 300$ mH, the equivalent inductance $L_{eq}$ is in first approximation equal to 18.3 H.

Figure 3:
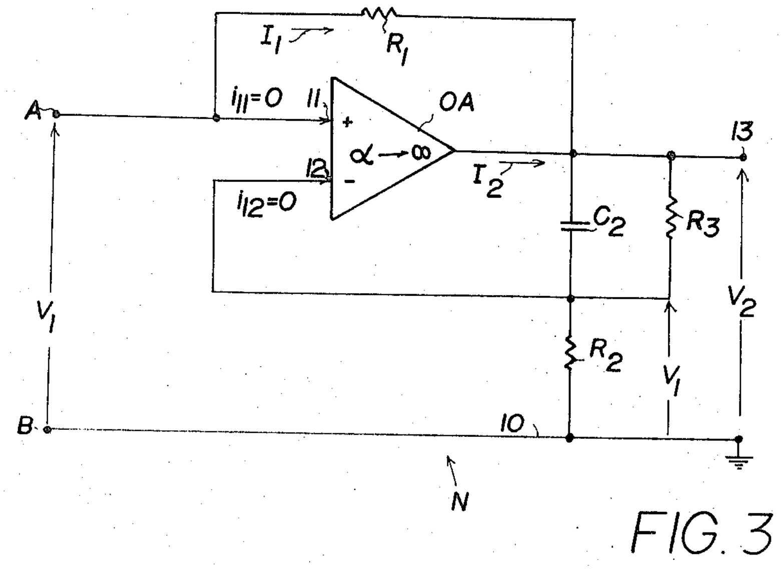
FIG. 3 gives details of an active two-terminal network included in the system of FIG. 1.

FIG. 3 illustrates a practical realization of the two-terminal network N as comprising a differential amplifier OA with a gain α approaching infinity, this amplifier having an input impedance $Z = V_1/I_1$ where $V_1$ is the voltage developed across points A and B. Point B lies on a grounded bus bar 10 forming a common terminal for the input side and the output side of the differential amplifier which also has a noninverting input terminal 11 connected to point A, an inverting input terminal 12 and an output terminal 13. A feedback connection from output terminal 13 to input terminal 11 includes a resistor $R_1$ traversed by a current $I_1$. Terminal 12 is grounded by a resistor $R_2$ and is connected to output 13 via a capacitor $C_2$ which in turn is shunted by a resistor $R_3$.

Because of the assumption that $\alpha = \infty$, the currents $i_{11}$ and $i_{12}$ flowing into input terminals 11 and 12 are zero and these two terminals are at the same potential so that input voltage $V_1$ also lies across resistor $R_2$; output terminal 13, which is not connected to any external circuit, develops a voltage $V_2$ with reference to the common reference terminal represented by bus bar 10.

If we consider the combination of capacitor $C_2$ and resistor $R_3$ as constituting an impedance $Z_2$, and if the output current leaving the amplifier OA is designated $I_2$, the following relationships obtain:

$$V_1 = V_2 + I_1 R_1 \tag{2}$$

$$V_2 = (I_1 + I_2)\,(Z_2 + R_2) \tag{3}$$

$$V_1 = (I_1 + I_2) R_2 \tag{4}$$

By eliminating $V_1$ and $V_2$ from the foregoing equations, we find that $$Z = -R_1 R_2 / Z_2 \tag{5}$$

If resistor $R_3$ is omitted, $Z_2 = 1/j\omega C_2$ whence $$Z' = -j\omega C_2 R_1 R_2 \tag{5'}$$

which is the equivalent of a negative inductance of absolute magnitude $C_2 R_1 R_2$.

With resistor $R_3$ included in the circuit, we have $Z_2$ equal to $R_3/(1+R_3 j\omega C_2)$ whence $$Z'' = -R_1 R_2 / R_3 - j\omega C_2 R_1 R_2 \tag{5''}$$

In either case, $C_2 R_1 R_2$ should be somewhat greater than L'.

From the latter equation it will be noted that the impedance of the shunt network now also has a frequency-independent negative resistive component $(-R_1 R_2/R_3)$ designed to stabilize the circuit against parasitic oscillations. Thus, the direct-current impedance of the equivalent circuit of FIG. 2 equals, by analogy with equation (1), $RR_p/R-R_p$ which has a positive value for $|-R| > R_p$.

We claim:

1. A coupling circuit for connecting a load to a low-frequency communication channel, comprising a transformer with a primary winding connected across a pair of supply terminals and a secondary winding connected across a pair of load terminals, and a two terminal network connected between said supply terminals in shunt with said primary winding, said network having a negative impedance with an inductive component whose absolute magnitude is on the order of that of the inductance of said primary winding, said network comprising: an operational amplifier with an inverting input terminal, a noninverting input terminal, an output terminal and a common reference terminal; a first resistor connected between said noninverting input terminal and said output terminal; a capacitor connected between said output terminal and said inverting input terminal; and a second resistor connected between said inverting input terminal and said common terminal.

2. A coupling circuit as defined in claim 1 wherein the absolute magnitude of said inductive component exceeds that of said inductance to an extent providing an effective circuit inductivity on the order of tens of henrys as measured between said supply terminals.

3. A coupling circuit as defined in claim 1 wherein said negative impedance also has a resistive component of absolute magnitude exceeding that of the resistance of said primary winding.

4. A coupling circuit as defined in claim 1, further comprising a third resistor in shunt with said capacitor.

5. A coupling circuit as defined in claim 4 wherein said primary winding has an appreciable parasitic resistance, said resistors being of such magnitude as to provide a resistive component of said negative impedance having an absolute magnitude greater than that of said parasitic resistance.

* * * * *